US008213136B2

(12) United States Patent
Maddali et al.

(10) Patent No.: US 8,213,136 B2
(45) Date of Patent: Jul. 3, 2012

(54) ENGINE HAVING POWER BUS FAULT SHORT CIRCUIT CONTROL WITH A DISCONNECTION SWITCH

(75) Inventors: Vijay K. Maddali, Rockford, IL (US); Gregory I. Rozman, Rockford, IL (US); Kevin Dooley, Mississauga (CA)

(73) Assignees: Pratt & Whitney Canada Corp., Quebec (CA); Hamilton Sundstrand Corporation, Windsor Locks, CT (US)

( * ) Notice: Subject to any disclaimer, the term of this patent is extended or adjusted under 35 U.S.C. 154(b) by 1120 days.

(21) Appl. No.: 11/839,763

(22) Filed: Aug. 16, 2007

(65) Prior Publication Data
US 2009/0045292 A1    Feb. 19, 2009

(51) Int. Cl.
*H02H 7/06* (2006.01)
*H02H 3/08* (2006.01)
*B64D 41/00* (2006.01)

(52) U.S. Cl. ............. 361/20; 361/21; 361/22; 361/93.1; 244/58

(58) Field of Classification Search .................. 361/93.1, 361/20, 21, 22; 244/58
See application file for complete search history.

(56) References Cited

U.S. PATENT DOCUMENTS

| 4,210,836 | A | * | 7/1980 | Kouba | 310/112 |
|---|---|---|---|---|---|
| 4,442,396 | A | * | 4/1984 | Hucker | 322/21 |
| 5,466,974 | A | * | 11/1995 | Sutrina et al. | 307/38 |
| 5,497,332 | A | * | 3/1996 | Allen et al. | 700/295 |
| 5,764,502 | A | * | 6/1998 | Morgan et al. | 363/65 |
| 6,704,625 | B2 | * | 3/2004 | Albero et al. | 701/3 |
| 6,825,640 | B1 | | 11/2004 | Hill | |
| 6,850,043 | B1 | * | 2/2005 | Maddali | 322/25 |
| 6,920,023 | B2 | | 7/2005 | Dooley | |
| 6,936,948 | B2 | | 8/2005 | Bell | |
| 6,965,183 | B2 | | 11/2005 | Dooley | |
| 7,109,606 | B2 | * | 9/2006 | Bedouet | 307/81 |
| 7,126,313 | B2 | | 10/2006 | Dooley | |
| 7,513,119 | B2 | * | 4/2009 | Zielinski et al. | 60/778 |
| 7,554,796 | B2 | * | 6/2009 | Coffey et al. | 361/643 |

(Continued)

FOREIGN PATENT DOCUMENTS

EP    1501167    1/2005

(Continued)

OTHER PUBLICATIONS

European Search Report dated Oct. 28, 2008.

*Primary Examiner* — Rexford Barnie
*Assistant Examiner* — Zeev V Kitov
(74) *Attorney, Agent, or Firm* — Carlson, Gaskey & Olds, PC

(57) ABSTRACT

An aircraft electrical system comprises a generator to be driven as part of a gas turbine engine. The generator supplies electrical power to a plurality of accessories associated with the gas turbine engine, and to an aircraft power bus in parallel to the supply to the accessories. A control detects a short circuit on the aircraft power bus. When a short circuit is detected on the aircraft power bus, a switch is driven open to disconnect the aircraft power bus from the generator. In this manner, the power will continue to be delivered to the plurality of accessories. In a separate feature, a control voltage is provided by an auxiliary permanent magnet generator to a voltage regulator for the main generator.

12 Claims, 3 Drawing Sheets

U.S. PATENT DOCUMENTS

| | | |
|---|---|---|
| 2003/0057926 A1 | 3/2003 | Huggett et al. |
| 2004/0119454 A1 | 6/2004 | Chang et al. |
| 2005/0056021 A1 | 3/2005 | Belokon et al. |
| 2005/0103931 A1 * | 5/2005 | Morris et al. .................. 244/58 |
| 2006/0113967 A1 | 6/2006 | Dooley |
| 2006/0226721 A1 | 10/2006 | Dooley |

FOREIGN PATENT DOCUMENTS

| | | |
|---|---|---|
| GB | 2422875 | 9/2006 |
| JP | 05300640 | 11/1993 |

* cited by examiner

ENGINE HAVING POWER BUS FAULT SHORT CIRCUIT CONTROL WITH A DISCONNECTION SWITCH

BACKGROUND OF THE INVENTION

This application relates to an electric system for a generator in a gas turbine engine, which generates power for both a related aircraft through a power bus, and engine accessories through an accessory bus. A switch is opened in the event of a detection of a short circuit on the aircraft power bus to disconnect the bus from the engine accessories. Thus, the engine accessories can continue to be driven.

A power generating system converts motive power generated by a prime mover, such as gas turbine engine to DC electrical power that is supplied to a DC bus to which various aircraft electrical components may be connected.

Recently, electric engine architecture has been developed which includes an integrated generator associated with a gas turbine engine. Power generated by the generator flows to an aircraft power bus and, also to a plurality of engine accessories. Thus, the engine accessories are powered directly by the generated electric power and the power for other aircraft functions is also supplied from the generator. The power bus and the accessories are in parallel relative to each other.

There is a potential with this arrangement that a short circuit on the power bus can divert power from the engine accessories. In addition, a voltage regulator for controlling the voltage flowing from the generator will receive no control voltage in the event of a short circuit. In the known system, the control voltage is received from the power bus. However, in the event of a short circuit, there would be no control voltage.

In the prior art, it is also known to provide a control permanent magnet generator in addition to a wound coil main generator in the gas turbine engine. Power generated from the control permanent magnet generator is delivered to a voltage regulator for the wound coil generator. This arrangement has not been utilized in a system wherein there are engine accessories provided with power in parallel to a power bus, nor where the main generator is a permanent magnet generator.

SUMMARY OF THE INVENTION

In the disclosed embodiment of this invention, a control monitors a power bus on an aircraft for short circuits. The power bus is disclosed as a DC power bus. If a short circuit is detected, then a switch is opened to disconnect the power bus from at least one engine accessory which is provided power in parallel with the power bus when the switch is closed. In this manner, the accessories can continue to be driven until short circuit fault is cleared.

In a separate aspect of this invention, a main permanent magnet generator is also provided with a control permanent magnet generator to deliver a control voltage. In the event of a short circuit on the power bus, control voltage is provided to a voltage regulator for the main generator from the control permanent magnet generator.

These and other features of the present invention can be best understood from the following specification and drawings, the following of which is a brief description.

DETAILED DESCRIPTION OF THE PREFERRED EMBODIMENT

Figure 1:
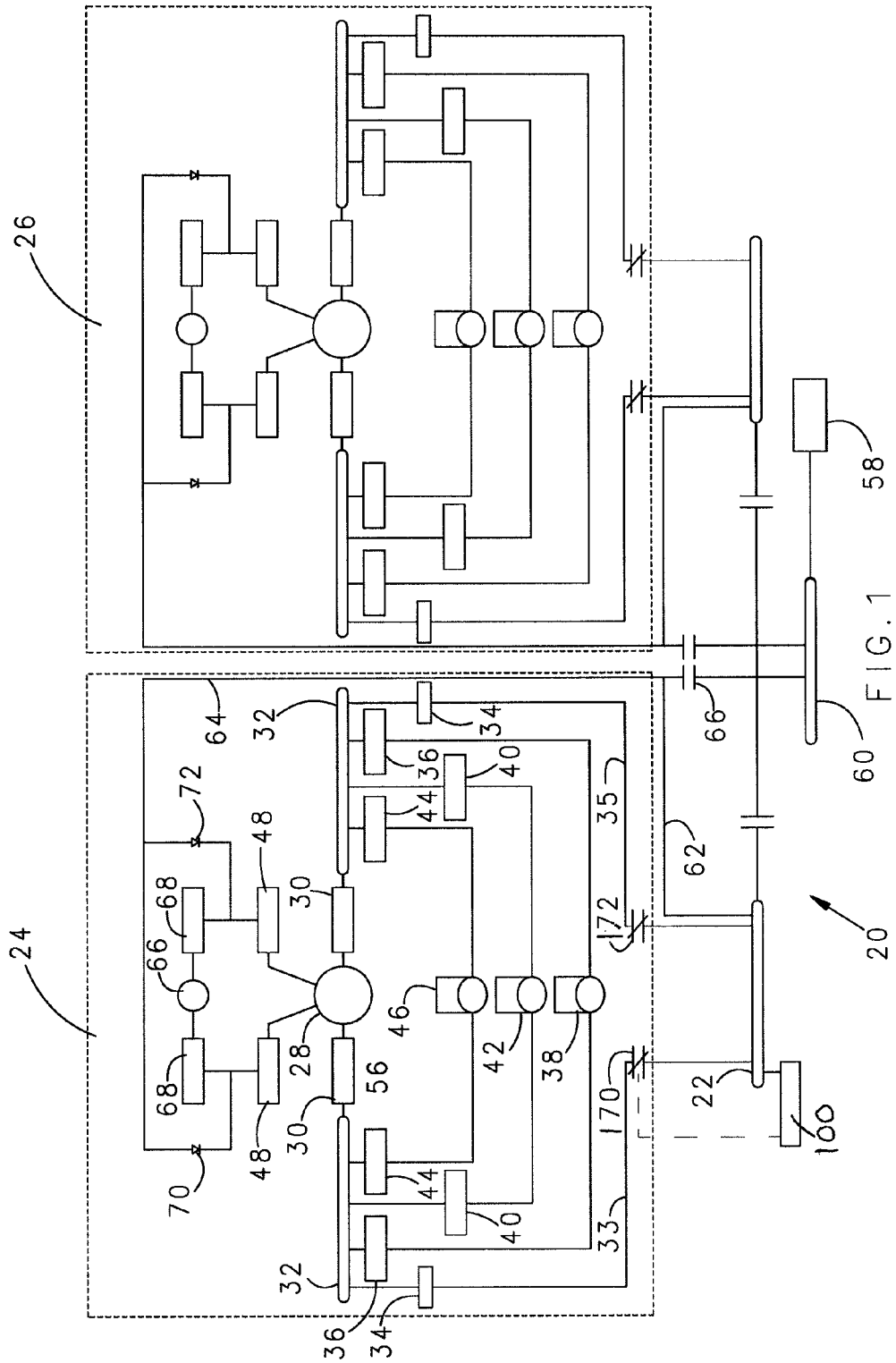
FIG. 1 shows a schematic for a pair of gas turbine engines associated with an aircraft.

FIG. 1 shows a system 20 including a pair of engines 24 and 26 associated with an aircraft. The electrical system for engine 24 will be described, but it should be understood that engine 26 has a similar system. An aircraft power bus 22 receives power from a generator 28, as will be explained. A pair of inverter/rectifiers 30 receive the power generated by the generator 28, and distribute that power to an engine accessory bus 32. Power from the engine accessory bus 32 passes through filters 34, and through lines 33 and 35 to an aircraft DC bus 22. Motor controllers 36, 40 and 44 provide control to an air pump and its motor 38, a lube pump and its motor 42, and a fuel pump and its motor 46.

As illustrated, generator 28 is an integrated starter-generator. However, it should be understood that this application extends not only to an integrated starter-generator operating in a generator mode, but also to stand-alone generators.

One such known electrical system is disclosed in United States published patent applications 2004/039202A1, 2006/0226721A1, and 2006/0113967A1. The present invention is directed to improving upon these basic systems, as will be described below. The generator 28, as disclosed, is also a permanent magnet generator.

One concern with the basic arrangement of the system 20 occurs if a short circuit occurs on the aircraft power bus 22. Since the accessory motors 38, 42 and 46 are in parallel with the aircraft power bus 22, they will be drained to the short circuit on the aircraft power bus 22. Thus, power will not flow to the motors 38, 42 and 46. Of course, the air pump, lube pump and fuel pump are flight critical components for the associated gas turbine engines 24 and 26, and it is important to maintain their operation.

To address a potential short circuit, the present invention incorporates a control 100 which can sense when a short circuit occurs on the aircraft DC bus 22. Switch 70 is controlled by the control 100. Of course, the control 100 may be the main controller for the engine, and can communicate with many more items. However, for purposes of understanding this invention, all that need be understood is the control 100 controls the switch 70.

A voltage regulator 48 receives a control voltage, normally from a permanent magnet generator 66, which passes power through a rectifier 68. The permanent magnet generator 66 is an auxiliary generator that is driven along with the main generator 28. As shown, battery 60 is also connected through the diode 66 to a line 64 passing through another diode 70/72 to the voltage regulators 48. At start-up, this battery power is utilized to provide the control power.

FIG. 1 shows a normal power generation mode, such as would occur when the aircraft is in flight. The gas turbine engine drives the generator 28, and power is generated to power the motors 38, 42 and 46, and to deliver additional power to the aircraft DC bus 22. As can be seen, the diode 66 is anti-biased in this condition and blocks power from the battery 58 to the aircraft DC bus.

Figure 2:
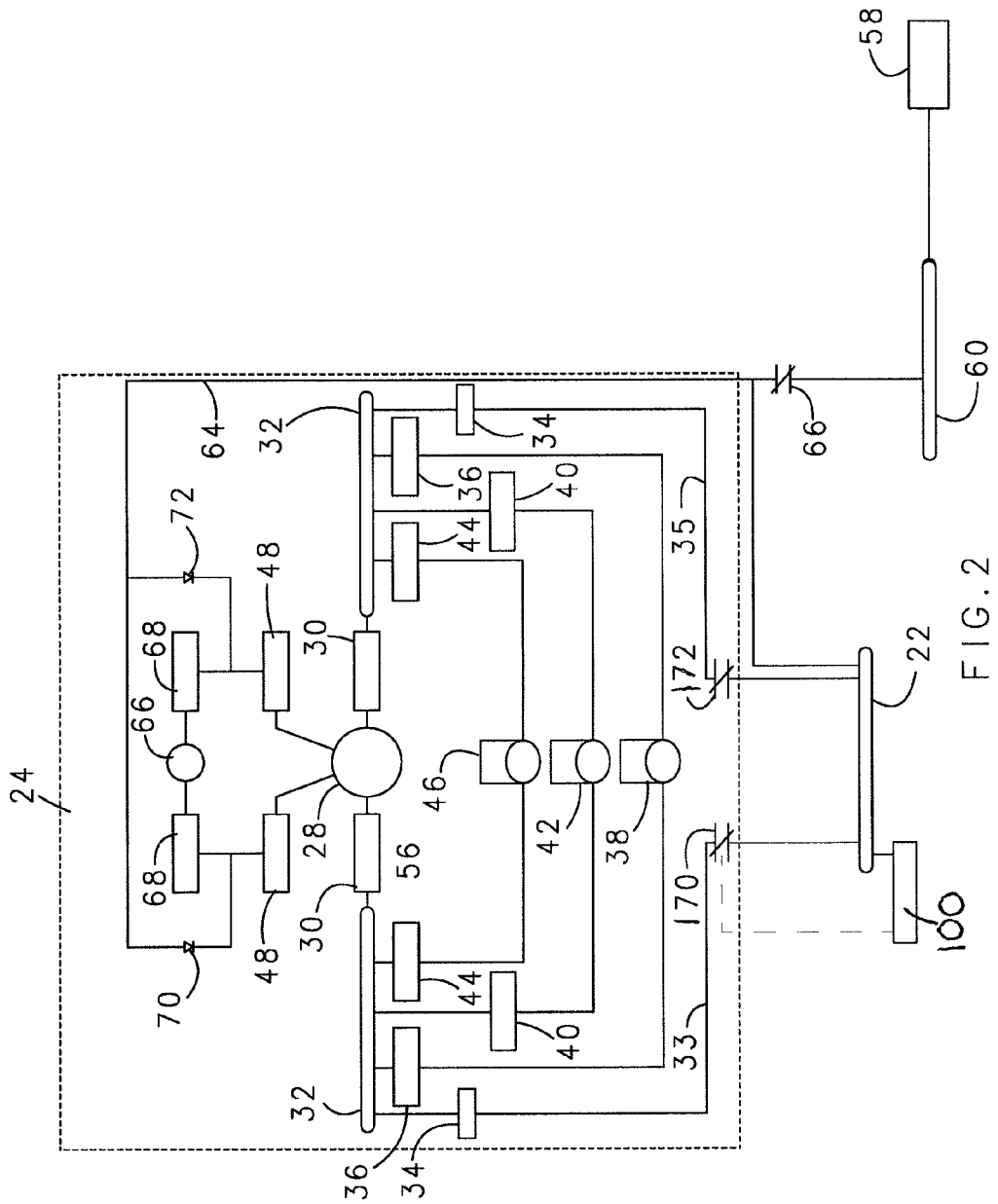
FIG. 2 shows one of the engines of FIG. 1 in a start mode.

FIG. 2 shows a start mode. In the start mode of FIG. 2, the switches 170 and 172 are maintained closed. The diode 66 allows power to flow from the battery to the bus 22, and this power will then flow to the generator, to begin to operate the generator as a motor to start the gas turbine engine.

Figure 3:
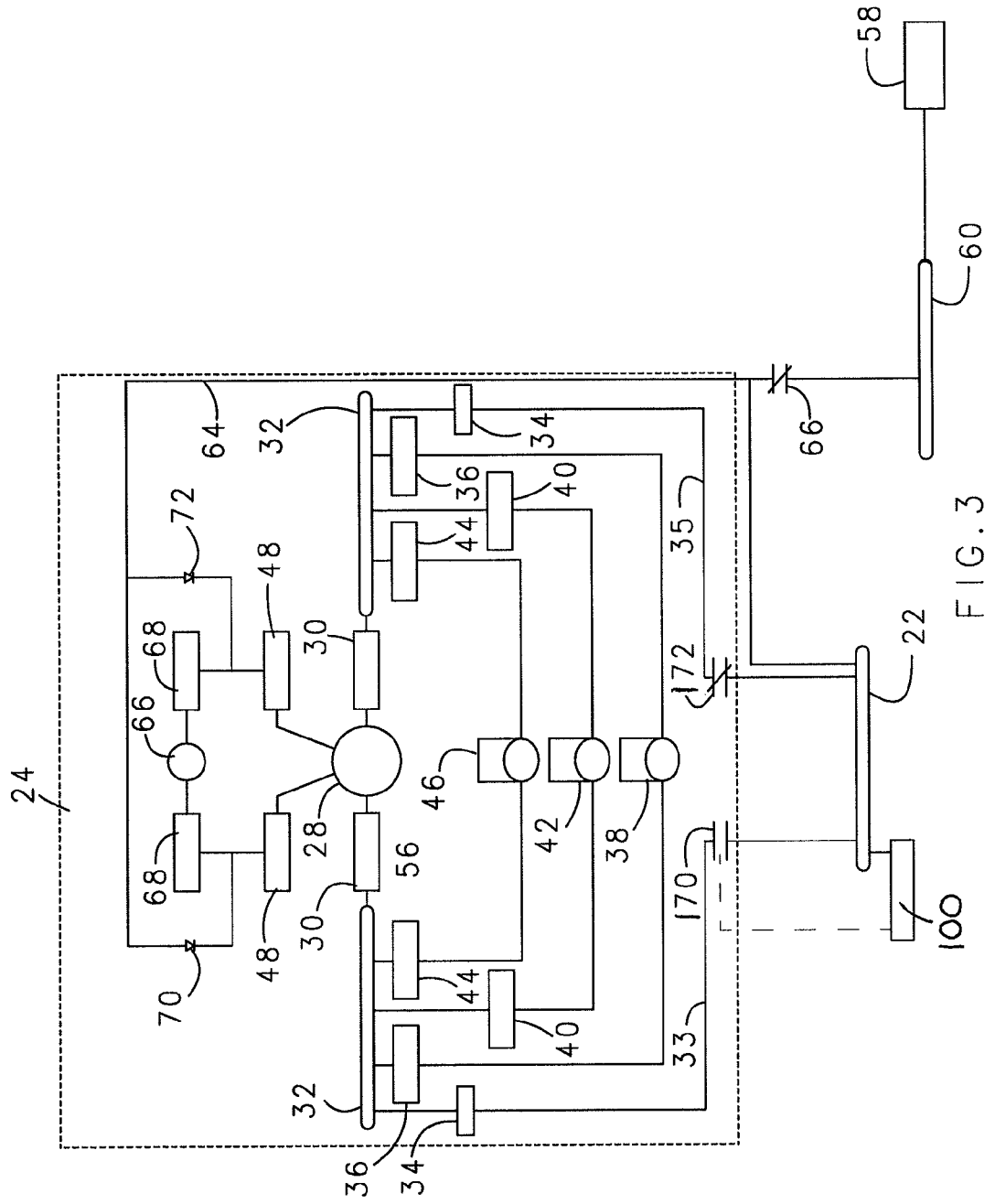
FIG. 3 shows one of the engines of FIG. 1 in a position to correct for a short circuit on an aircraft power bus.

FIG. 3 shows the arrangement when the control 100 has detected a short circuit on the aircraft power bus 22. Under this condition, the control 100 opens the switch 170. After some short period of time, the short circuit is corrected, and the control 100 can then close the switch 170.

Also, during the short circuit, the control voltage for the voltage regulator is supplied from the auxiliary permanent magnet generator 66.

The present invention thus provides a method of avoiding any concerns with a short circuit on an aircraft power bus, in an engine architecture where a plurality of engine accessories are mounted in parallel with the bus.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An aircraft electrical system comprising:
   a main generator to be driven as part of a gas turbine engine;
   said main generator supplying electrical power to a plurality of accessories associated with the gas turbine engine, and said main generator supplying power to an aircraft power bus in parallel to the supply to said accessories; and
   a control for detecting a short circuit on the aircraft power bus, said control opening a power switch to break a connection between said main generator and said aircraft power bus when a short circuit is detected.

2. The aircraft electrical circuit as set forth in claim 1, wherein said main generator supplies power to an engine accessory bus, and power flowing from the engine accessory bus in parallel to said accessories, and also to said aircraft power bus.

3. The aircraft electrical system as set forth in claim 1, wherein said accessories include at least a fuel pump and a lube pump.

4. The aircraft electrical system as set forth in claim 1, wherein a permanent magnet generator is associated with said main generator, and supplies a control voltage to a voltage regulator for said main generator when a short circuit has been detected.

5. The aircraft electrical system as set forth in claim 4, wherein said main generator is also a permanent magnet generator.

6. The aircraft electrical system as set forth in claim 1, wherein a battery supplies a control voltage to a voltage regulator for said main generator through the battery switch at a start mode.

7. An electrical system and engine for an aircraft comprising:
   an aircraft power bus;
   a main generator for supplying electrical power to the aircraft power bus, said main generator being associated with a gas turbine engine, such that rotation of the gas turbine engine generates electrical power for supply to the aircraft power bus, and said main generator further supplying electrical power to at least an engine fuel pump and an engine lube pump in parallel to the supply of electrical power to the aircraft power bus;
   a permanent magnet auxiliary generator associated with said main generator, said permanent magnetic auxiliary generator providing power to a voltage regulator for said main generator, at least when a fault is detected on the aircraft power bus;
   a power switch for selectively disconnecting said aircraft power bus from said main generator, and a control for detecting a short circuit on the aircraft power bus, said control being operable to open said power switch when a short circuit is detected, such that said engine fuel pump and said engine lube pump can continue to be driven while the short circuit is occurring on the aircraft power bus.

8. The electrical system and engine as set forth in claim 7, wherein said main generator supplies power to an engine accessory bus, and power flowing from the engine accessory bus in parallel to said engine accessories, and also to said aircraft power bus.

9. The electrical system and engine as set forth in claim 7, wherein there are a pair of said gas turbine engines and said main generators, said pair of main generators supplying power to a common aircraft power bus.

10. A method of operating an aircraft electrical system including the steps of:
   (1) providing a main generator to be driven as part of a gas turbine engine;
   (2) said main generator supplying electrical power to a plurality of accessories associated with the gas turbine engine, and said main generator supplying power to an aircraft power bus in parallel to the supply to said accessories; and
   (3) detecting a short circuit on said aircraft power bus, opening a power switch to break a connection between said main generator and said aircraft power bus when a short circuit is detected.

11. The method of operating an aircraft electrical system as set forth in claim 10, wherein an auxiliary permanent magnet generator is associated with said main generator, and said auxiliary permanent magnet generator providing a control voltage to said main generator at least when the short circuit is detected in step (3).

12. An aircraft electrical system comprising:
   a main generator to be driven as part of a gas turbine engine;
   said main generator supplying electrical power to a plurality of accessories associated with the gas turbine engine, and said generator supplying power to an aircraft power bus in parallel to the supply to said air accessories;
   a control permanent magnet generator associated with said main generator, said main generator also being a permanent magnet generator, and said main generator having voltage regulators for regulating a voltage delivered by said main generator, said control permanent magnet generator supplying a control voltage to said voltage regulator, at least under certain conditions.

* * * * *